(12) United States Patent
Lu et al.

(10) Patent No.: US 11,009,476 B2
(45) Date of Patent: May 18, 2021

(54) SQUARAINE-POLYMER-BASED AMMONIUM/NITROGEN MONOXIDE TWO-COMPONENT SENSOR, AS WELL AS PREPARATION METHOD AND APPLICATION THEREOF

(71) Applicant: SOOCHOW UNIVERSITY, Suzhou (CN)

(72) Inventors: Jianmei Lu, Suzhou (CN); Jinghui He, Suzhou (CN)

(73) Assignee: SOOCHOW UNIVERSITY, Suzhou (CN)

(*) Notice: Subject to any disclaimer, the term of this patent is extended or adjusted under 35 U.S.C. 154(b) by 349 days.

(21) Appl. No.: 16/264,604

(22) Filed: Jan. 31, 2019

(65) Prior Publication Data

US 2019/0242842 A1 Aug. 8, 2019

(30) Foreign Application Priority Data

Feb. 2, 2018 (CN) .......................... 201810108596.5

(51) Int. Cl.
*G01N 27/12* (2006.01)
*C08G 73/02* (2006.01)

(52) U.S. Cl.
CPC .......... *G01N 27/126* (2013.01); *C08G 73/02* (2013.01)

(58) Field of Classification Search
None
See application file for complete search history.

(56) References Cited

U.S. PATENT DOCUMENTS 9,841,411 B2\* 12/2017 Lu ...................... G01N 33/0054
2017/0342201 A1\* 11/2017 Lu ............................ C22C 5/06

\* cited by examiner

*Primary Examiner* — Lisa M Caputo
*Assistant Examiner* — Nigel H Plumb
(74) *Attorney, Agent, or Firm* — SZDC Law P.C.

(57) ABSTRACT

The invention discloses a squaraine-polymer-based ammonium/nitrogen monoxide two-component sensor, as well as a preparation method and application thereof. A preparation manner and condition for the sensor are optimized. The squaraine polymer containing azo functional group based ammonium/nitrogen monoxide two-component sensor comprises an interdigital electrode and a coating material with which the interdigital electrode is coated. The coating material is a squaraine polymer containing azo functional group and has high sensing selectivity for ammonium and nitrogen monoxide, the minimum limit of detection thereof is 1 ppb and the response/reversion time is 82s/185s. The sensing performance of the sensor for nitrogen monoxide is also tested, the minimum limit of detection can reach 40 ppb and the response/reversion time is 112s/921s.

9 Claims, 12 Drawing Sheets

SQUARAINE-POLYMER-BASED AMMONIUM/NITROGEN MONOXIDE TWO-COMPONENT SENSOR, AS WELL AS PREPARATION METHOD AND APPLICATION THEREOF

This application claims priority to Chinese Patent Application No.: 201810108596.5, filed on Feb. 2, 2018, which is incorporated by reference for all purposes as if fully set forth herein.

FIELD OF THE INVENTION

The present invention belongs to the technical field of organic semiconductor devices, and particularly relates to an ammonia/nitric oxide two-component sensor based on squaraine polymer and a preparation method and application thereof.

TECHNICAL BACKGROUND

Ammonia has a corrosive and irritating effect on the skin tissue. It can absorb the water in the skin tissue to make the tissue protein denatured, and make the tissue fat saponified, and destroy the cell membrane structure. Ammonia has a high solubility, so it is mainly irritating and corrosive to the upper respiratory tract of animals or human bodies, and is often adsorbed on the skin mucosa and conjunctiva to cause irritation and inflammation. Ammonia can also paralyze respiratory cilia and damage the mucosal tissue, making pathogenic microorganisms easy to invade and reducing the body's resistance to disease. Ammonia is usually inhaled into the human body in the form of gas; after being inhaled into the lungs, ammonia easily enters the bloodstream through the alveoli and combines with hemoglobin to destroy the function of oxygen transport. Therefore ammonia is a highly toxic and highly polluting gas.

Ammonia is a gas widely used in the industry, whether it is refrigeration, steel production or feed and fertilizer production, ammonia is used in all aspect of the industry; therefore, with the growth of global industrial production, the amount of ammonia used is increasing year by year. Due to the high toxicity and high pollution property of ammonia gas, the devices for ammonia leakage detection are widely demanded.

Nitric oxide is unstable, and easily combines with oxygen to form acid gas such as nitrogen dioxide, which is one of the main gases causing acid rain. High level of nitric oxide can cause methemoglobinemia. There are certain chronic hazards mainly manifested as neurasthenia syndrome and chronic respiratory inflammation, in individual cases pulmonary fibrosis may occur, which can cause dental erosion.

SUMMARY OF THE INVENTION

According to such situation, the present invention provides an ammonia/nitric oxide two-component sensor preparing by adopting a squaraine polymer on the surface of an interdigital electrode, and observing the changes of the current of the sensor in ammonia (or nitrogen monoxide) with different concentrations, to detect the concentration. The ammonia/nitrogen monoxide two-component sensor of the invention can reach a minimum limit of detection of 1 ppb for ammonia gas and a minimum limit of detection of 40 ppb for the nitrogen monoxide; and the sensor is easy to manufacture, low in price and good in stability.

The present invention disclosed a squaraine-polymer-based ammonium/nitrogen monoxide two-component sensor, comprises an interdigital electrode and a coating material coated on said interdigital electrode; said coating material is a squaraine polymer; the chemical structure of said squaraine polymer is:

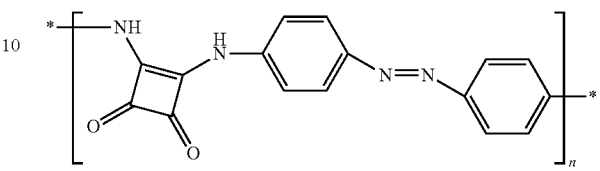

wherein n is 20 to 50.

The squaraine-polymer-based ammonium/nitrogen monoxide two-component sensor according in the present invention also comprises a substrate; the thickness of said coating material is 100 to 400 μm Preferably, in the squaraine-polymer-based ammonium/nitrogen monoxide two-component sensor, said interdigital electrode is based on an alumina ($Al_2O_3$) layer having a thickness of 1 to 2 mm, on which a silver-palladium (Ag—Pd) alloy electrode with a thickness of 100 nm is disposed.

Preferably, said interdigital electrode has a finger width of 100 μm and a finger pitch of 60 μm.

The present invention also disclosed a preparation method of the squaraine-polymer-based ammonium/nitrogen monoxide two-component sensor, comprising the following steps: brushing said squaraine polymer solution on the interdigital electrode, placing at room temperature, removing the solvent and drying for 0.5 to 2 hours at 50 to 80° C. to obtain the squaraine-polymer-based ammonium/nitrogen monoxide two-component sensor. Preferably, cleaning a substrate and fixing the interdigital electrode on the substrate before brushing said squaraine polymer solution on the interdigital electrode; in said squaraine polymer solution, the mass ratio of the squaraine polymer to the solvent is 4:(1 to 2). For example, the steps can be described as follows:

(1) cleaning a substrate and fixing the interdigital electrode on the substrate;

(2) dissolving the squaraine polymer in a solvent (ethanol, dichloromethane, or ethyl acetate) according to a mass ratio of the squaraine polymer: the solvent equal to 4:(1 to 2), and dispersing it uniformly to obtain a squaraine polymer solution;

(3) brushing the squaraine polymer solution on the interdigital electrode, placing at room temperature, removing the solvent and drying for 0.5 to 2 hours at 80° C. to obtain the squaraine-polymer-based ammonium/nitrogen monoxide two-component sensor.

Preferably, in the above preparation method, the substrate in step (1) is selected from any one of a glass substrate, a PE substrate, and an iron substrate, and is preferably a glass substrate.

Preferably, in the above preparation method, the fixing in step (1) is completed by bonding with a double side tape.

Preferably, in the above preparation method, the solvent in step (2) is selected from any one of ethanol, dichloromethane, and ethyl acetate, preferably ethanol.

Preferably, in the above preparation method, the brushing in step (3) is performed by using a brush pen.

Preferably, in the above preparation method, the brushing in step (3) is set as: the number of brushing is about 20 times, and after brushing is finished each time, waiting till the surface is dried to brush the next time.

Preferably, in the above preparation method, the drying temperature in step (3) is 60° C., drying time is 1 hour.

Preferably, in the above preparation method, the drying in step (3) is performed by a vacuum oven.

The present invention also disclosed a squaraine polymer, the chemical structure of said squaraine polymer is:

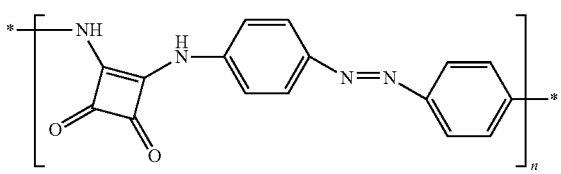

wherein n is 20 to 50.

The present invention also disclosed the preparation method of above said squaraine polymer, characterized in comprising the following steps, heating and reacting in a solvent using 4,4'-diaminoazobenzene and squaric acid as raw materials to obtain the squaraine polymer.

The present invention also disclosed a preparation method of a squaraine polymer solution, comprising the following steps, heating and reacting in a solvent using 4,4'-diaminoazobenzene and squaric acid as raw materials to obtain a squaraine polymer; dissolving the squaraine polymer in a solvent according to a mass ratio of the squaraine polymer: the solvent equal to 4:(1 to 2), and dispersing it uniformly to obtain a squaraine polymer solution. The solvent is selected from any one of ethanol, dichloromethane, and ethyl acetate, preferably ethanol.

The preparation method can be described as:

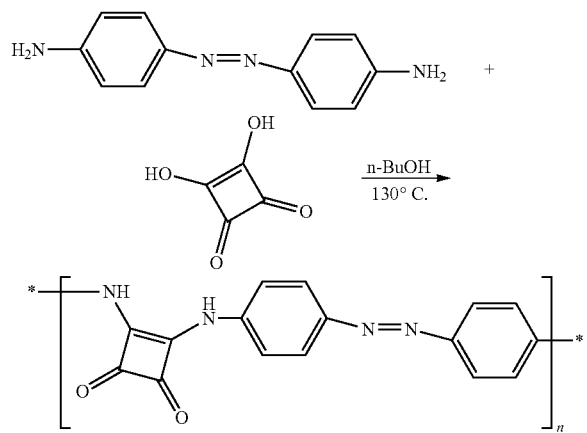

The present invention disclosed the application of the squaraine polymer or the squaraine polymer solution in the preparation of ammonium/nitrogen monoxide two-component sensor.

The present invention disclosed an application of a squaraine-polymer-based ammonium/nitrogen monoxide two-component sensor in environmental testing, such as air humidity detection.

Compared with existing technologies, the present invention has the advantages as followed:

(1) The device disclosed by the invention is convenient to prepare and simple to operate.

(2) The device disclosed in the present invention has a short response time, a higher response to ammonia gas and nitric oxide than a common metal oxide, and a low detection limit;

(3) The device disclosed in the present invention has a short recovery time and stable device performance.

DETAILED DESCRIPTION OF THE INVENTION

The technical solution of the present invention will be further described below in conjunction with the accompanying drawings and specific embodiments. Unless otherwise indicated, the reagents, materials, instruments, and the like used in the following examples can be obtained by commercial means.

EXAMPLE 1

Figure 1:
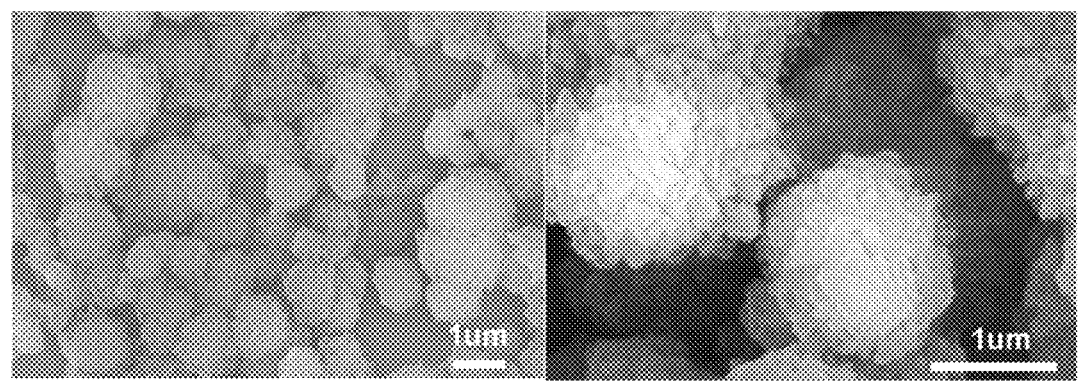
FIG. 1 is the SEM image of the squaraine polymer.
Figure 2:
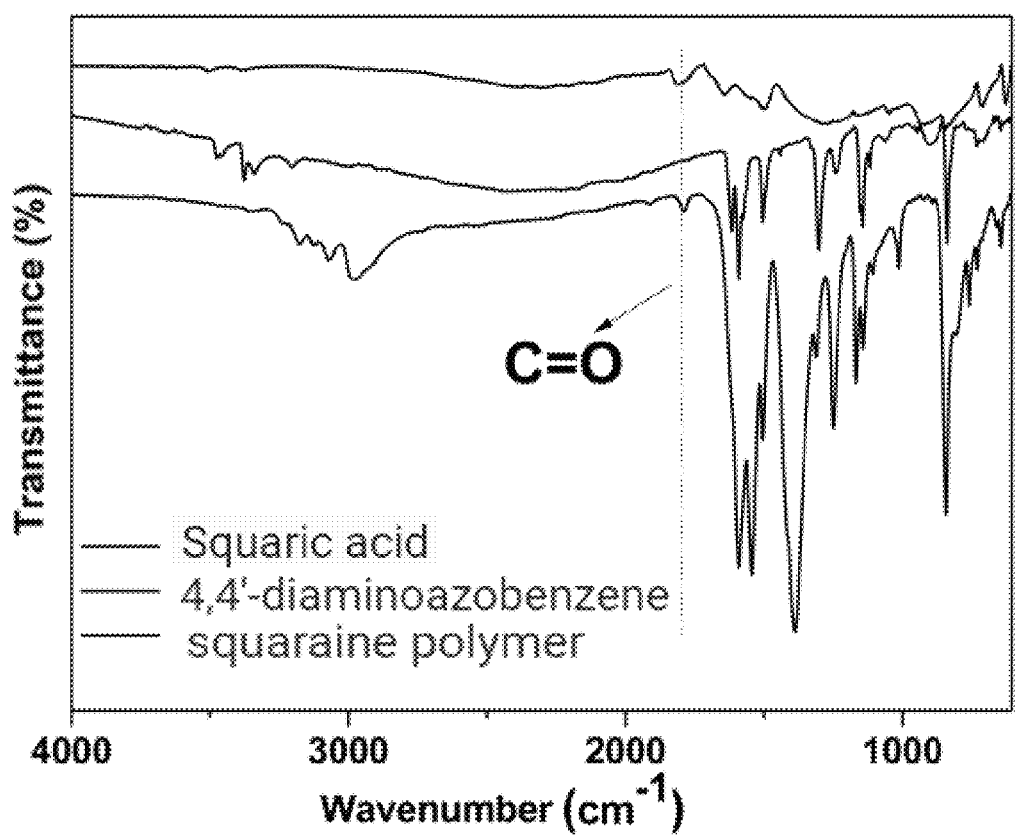
FIG. 2 is the infrared image of the squaraine polymer.
Figure 3:
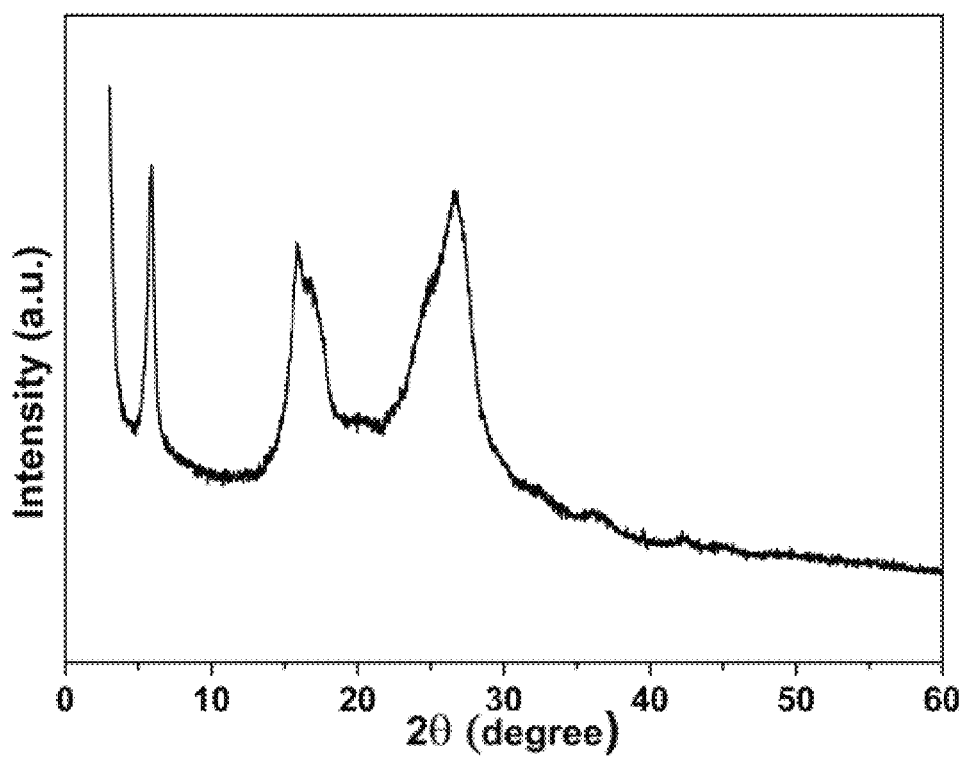
FIG. 3 is the XRD pattern of the squaraine polymer.
Figure 4:
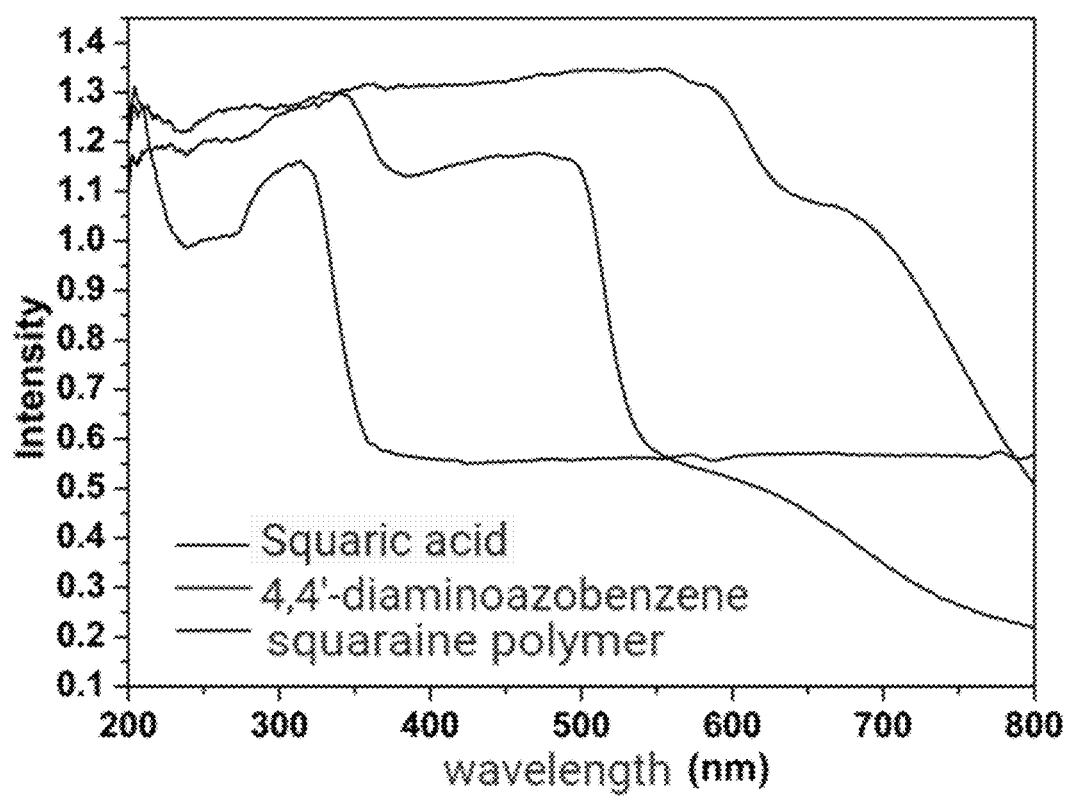
FIG. 4 is an ultraviolet visible spectrum of a squaraine polymer.
Figure 5:
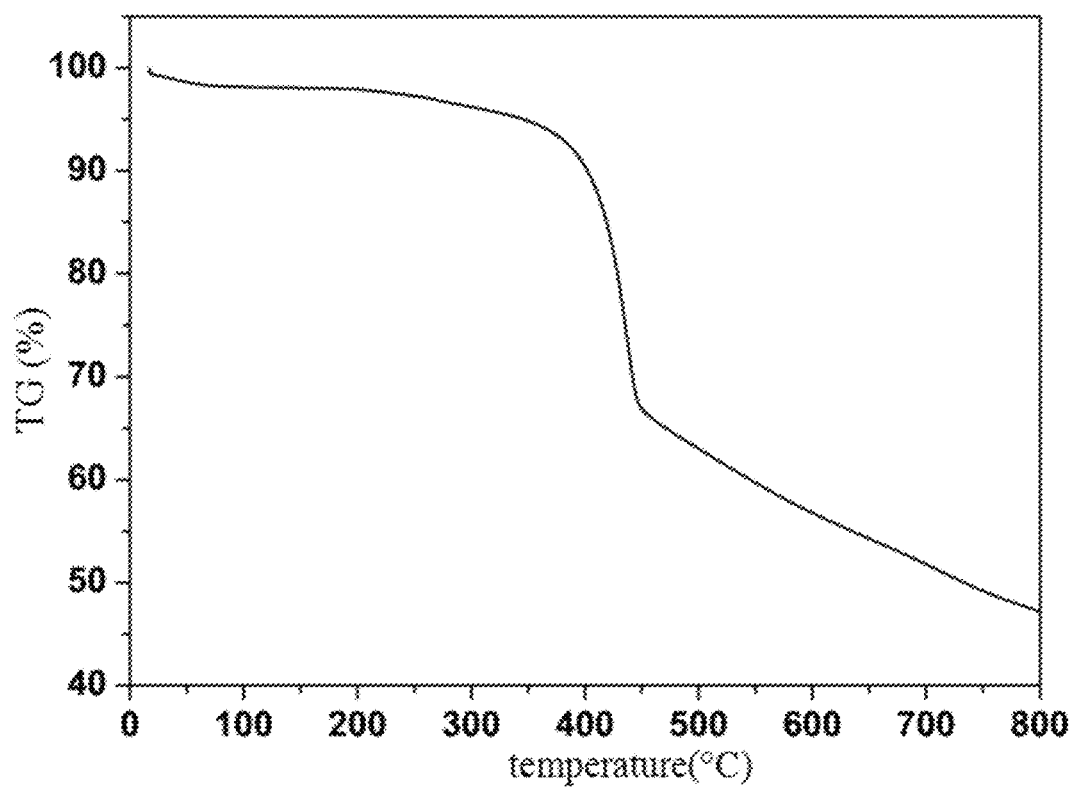
FIG. 5 is a thermogravimetric analysis diagram of a squaraine polymer.

Synthesis of a Squaraine Polymer 4,4'-Diaminoazobenzene (0.7 g, 3 mmol.) and squaric acid (0.5, 4 mmol) are weighed and placed in n-butanol (35 mL), heated at 130° C. and refluxed for 18 h. After the reaction is completed, the temperature is lowered to room temperature, and the product is filtered and washed with ethyl acetate three times, filtered, and dried in vacuo to give a squaraine polymer (0.96 g, yield: 55%). The degree of polymerization is 40. Its microstructure is shown in FIG. 1, and its chemical structure is as follows:

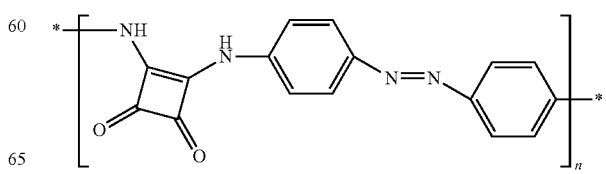

The identification spectrum is shown in FIG. 2 to FIG. 5: It can be seen from the infrared spectrum that the hydroxylation peak of the raw material squaraine disappears, and the carbonyl peak of the product is relatively obvious, and the carbonyl group in the squaric acid is displaced. The polymer was successfully synthesized; and the squaraine polymer was more prominent in the X-ray diffraction (XRD) test.

EXAMPLE 2

Figure 6:
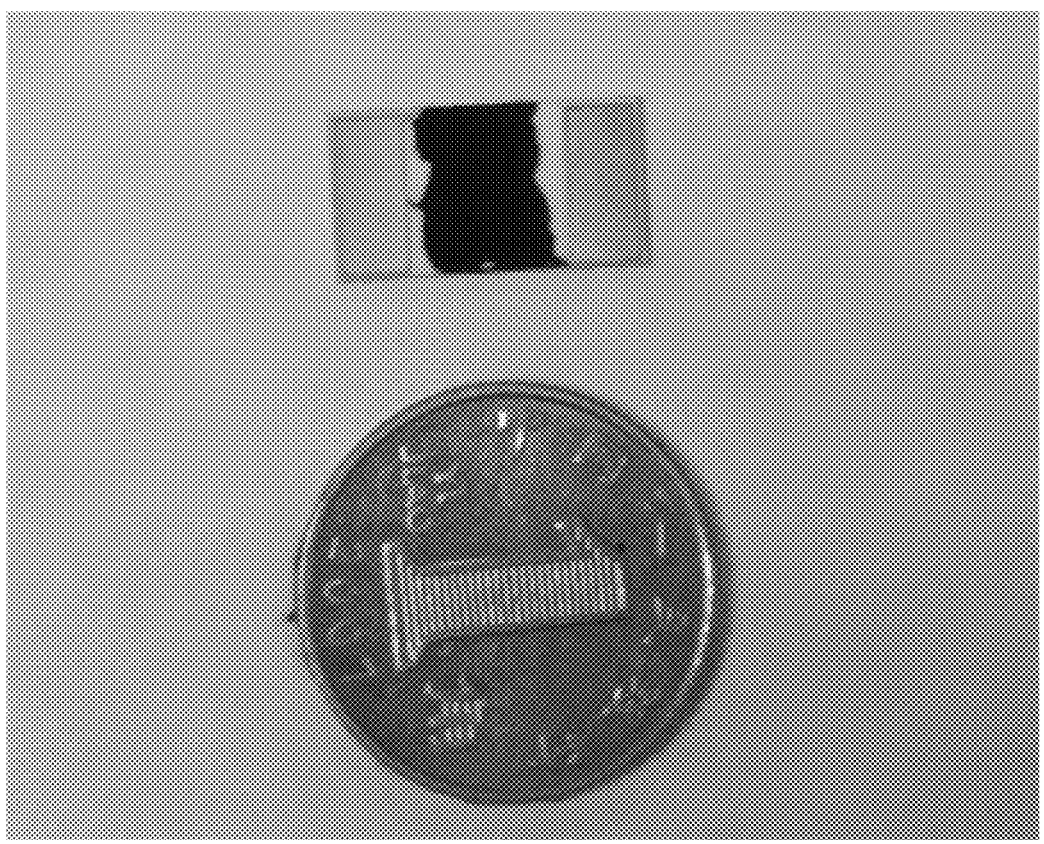
FIG. 6 is a physical diagram of a squaraine-polymer-based ammonia/nitric oxide two-component sensor.

Preparation of the Sensor (a) cleaning the glass substrate, and bonding the interdigital electrode to the substrate by a double-sided tape, the interdigitated electrode is made of alumina (1 mm), and a silver-palladium alloy electrode (100 nm) is disposed thereon, and the interdigitated width is 200 μm, the interdigitated spacing is 60 μm;

(b) The squaraine polymer (4 mg) of Example 1 is dissolved in ethanol (2 g) to make it uniformly dispersed, and obtain an ethanol solution;

(c) Brushing the ethanol solution of the squaraine polymer on the interdigitated electrode, brushing it 20 times, after each brushing, the surface is dried and then brushed again, left at room temperature, and then evaporated the ethanol. Drying at 60° C. for 1 h in a vacuum oven to obtain an ammonia/nitric oxide two-component sensor based on squaraine polymer. The structure is shown in FIG. 6, in which the film thickness is 400 μm.

EXAMPLE 3

Figure 7:
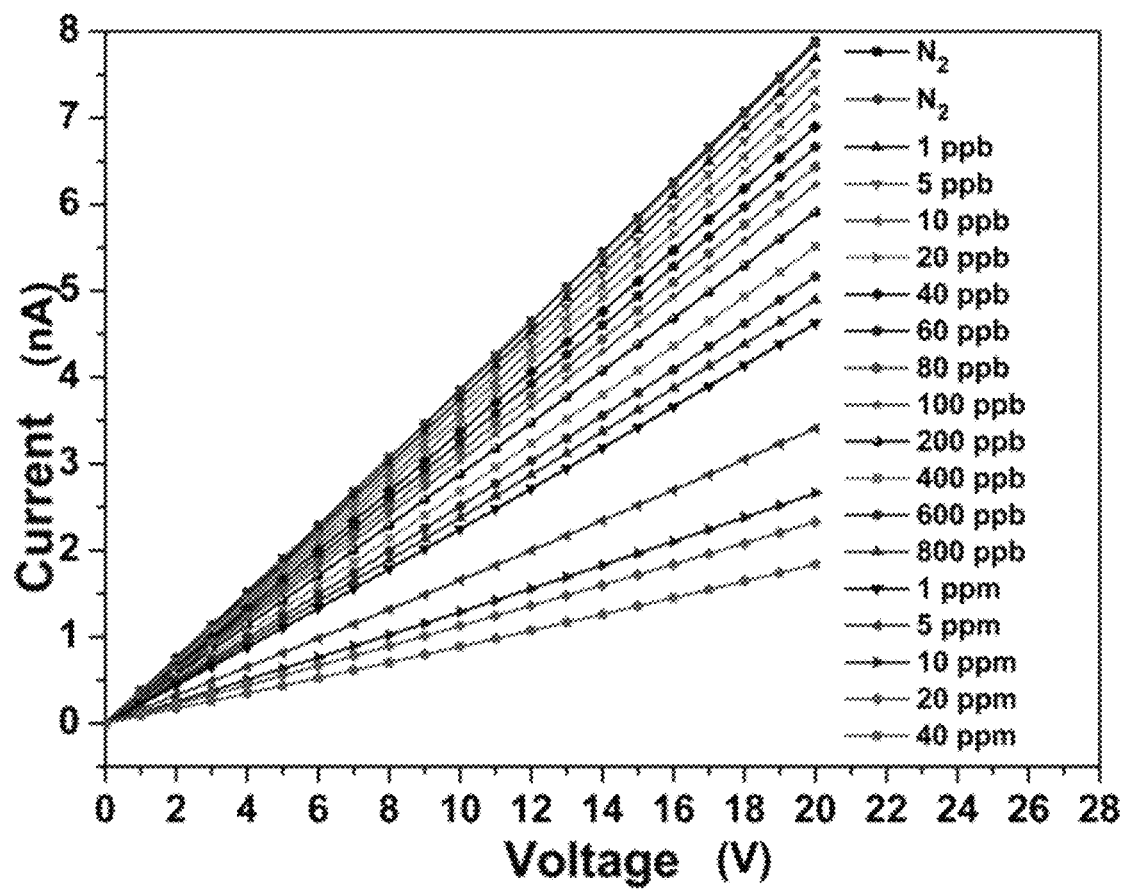
FIG. 7 shows the current change of the sensor under different concentrations of ammonia.
Figure 10:
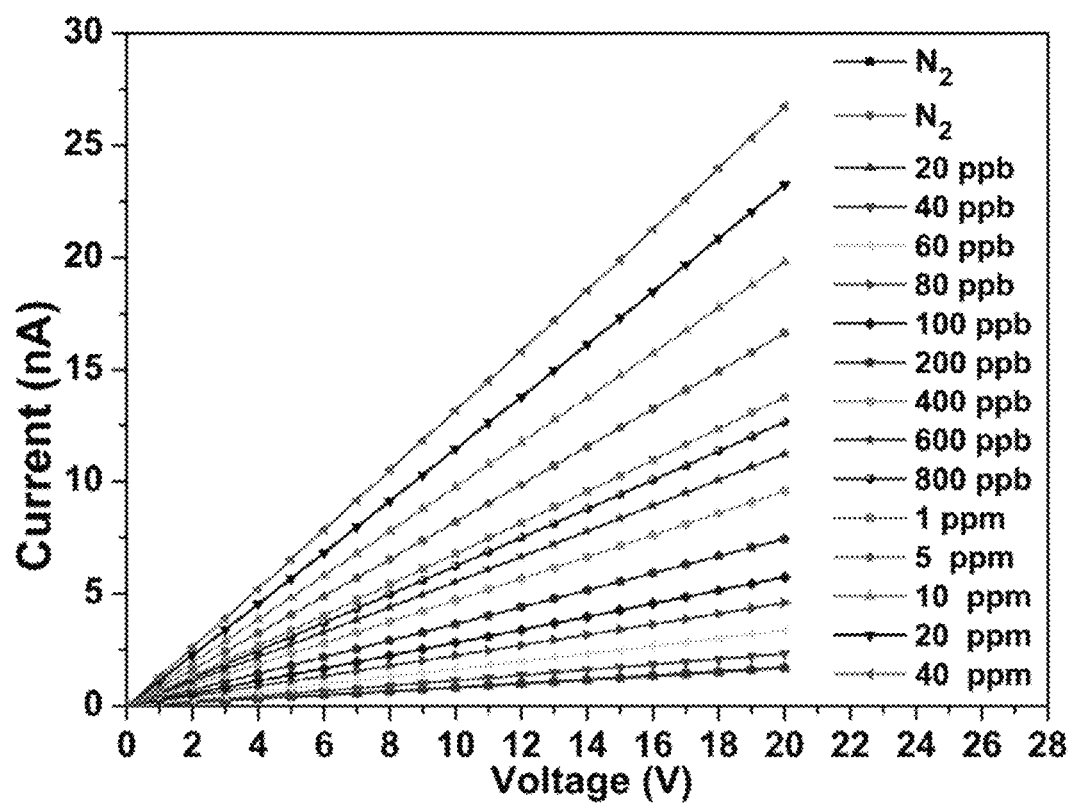
FIG. 10 shows the current change of the sensor under different concentrations of nitric oxide.

Determination of Current Response of the Squaraine-Polymer-Based Ammonium/Nitrogen Monoxide Two-Component Sensor Under Different Concentrations of Ammonia The squaraine-based ammonia/nitric oxide two-component sensor of Example 2 is placed in a test machine at a voltage range of 0-20 V, and the device is tested at 1 ppb, 5 ppb, 10 ppb, 20 ppb, 40 ppb, 60 ppb, 80 ppb, 100 ppb, 200 ppb, 400 ppb, 600 ppb, 800 ppb, 1 ppm, 5 ppm, 10 ppm, 20 ppm, 40 ppm. The current changes in different ammonia concentrations, the results are shown in FIG. 7, indicating that it can response to 1 ppb concentration Ammonia. Using the same method, the detection device is tested at the concentrations of 40 ppb, 60 ppb, 80 ppb, 100 ppb, 200 ppb, 400 ppb, 600 ppb, 800 ppb, 1 ppm, 5 ppm, 10 ppm, 20 ppm, 40 ppm of nitric oxide, to record the current changes, the results are shown in FIG. 10.

Figure 8:
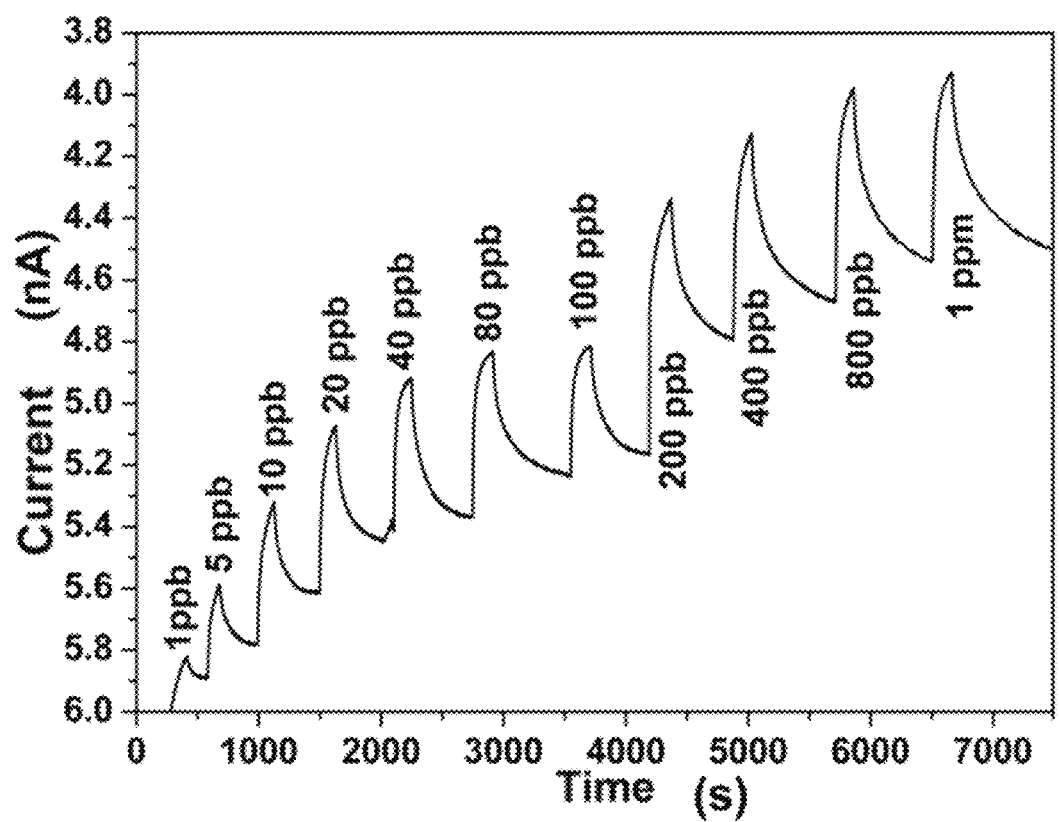
FIG. 8 is a pulse curve of the sensor at different ammonia concentrations.
Figure 11:
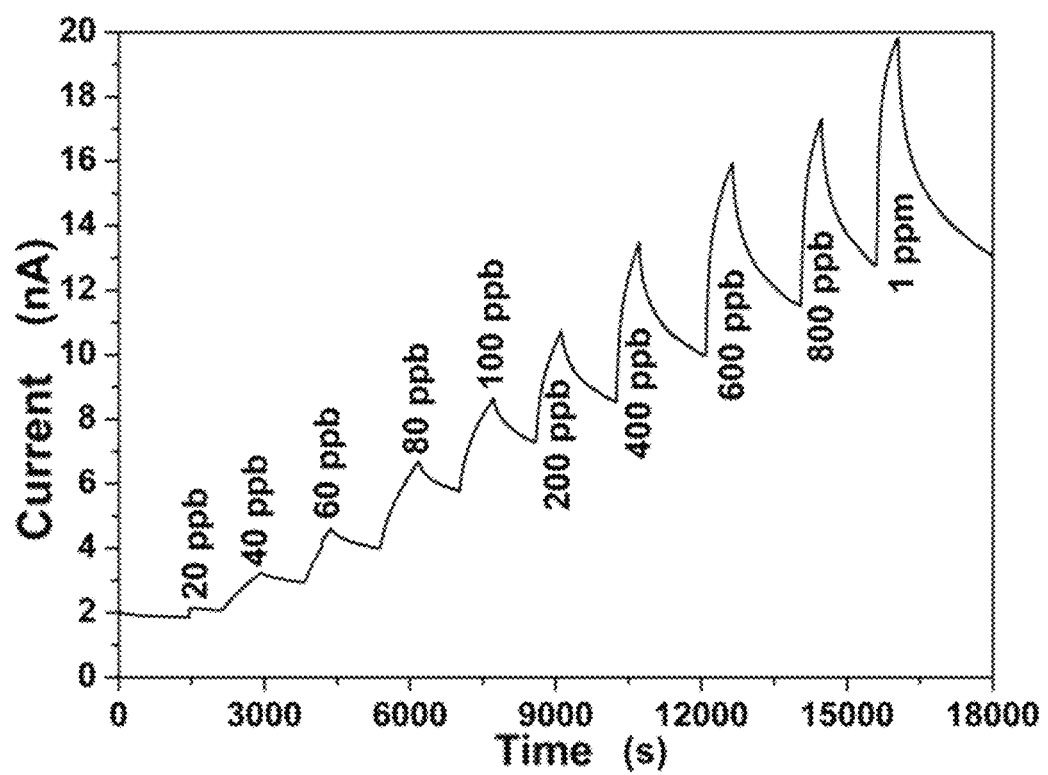
FIG. 11 is a pulse curve of the sensor at different concentrations of nitric oxide.

Detection of the recovery of the squaraine-polymer-based ammonium/nitrogen monoxide two-component sensor at 1 ppb to 1 ppm concentrations of ammonia, and at 40 ppb to 1 ppm of concentrations nitrogen monoxide:

Firstly, the device is placed under pure nitrogen conditions. After the current is stabilized, the device is placed under a different concentration of ammonia gas. After the current is stabilized, the device is re-purified under nitrogen conditions, repeating the above operations and the results are shown in FIG. 8 and FIG. 11.

Figure 9:
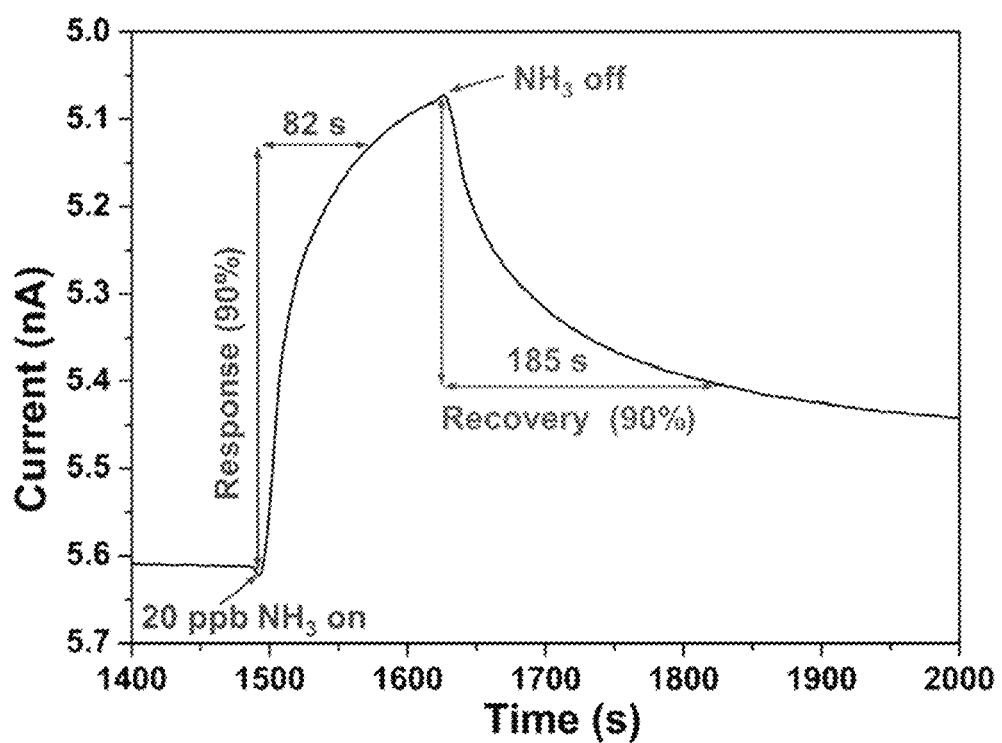
FIG. 9 shows the response time and recovery time of the sensor to 20 ppb ammonia.
Figure 12:
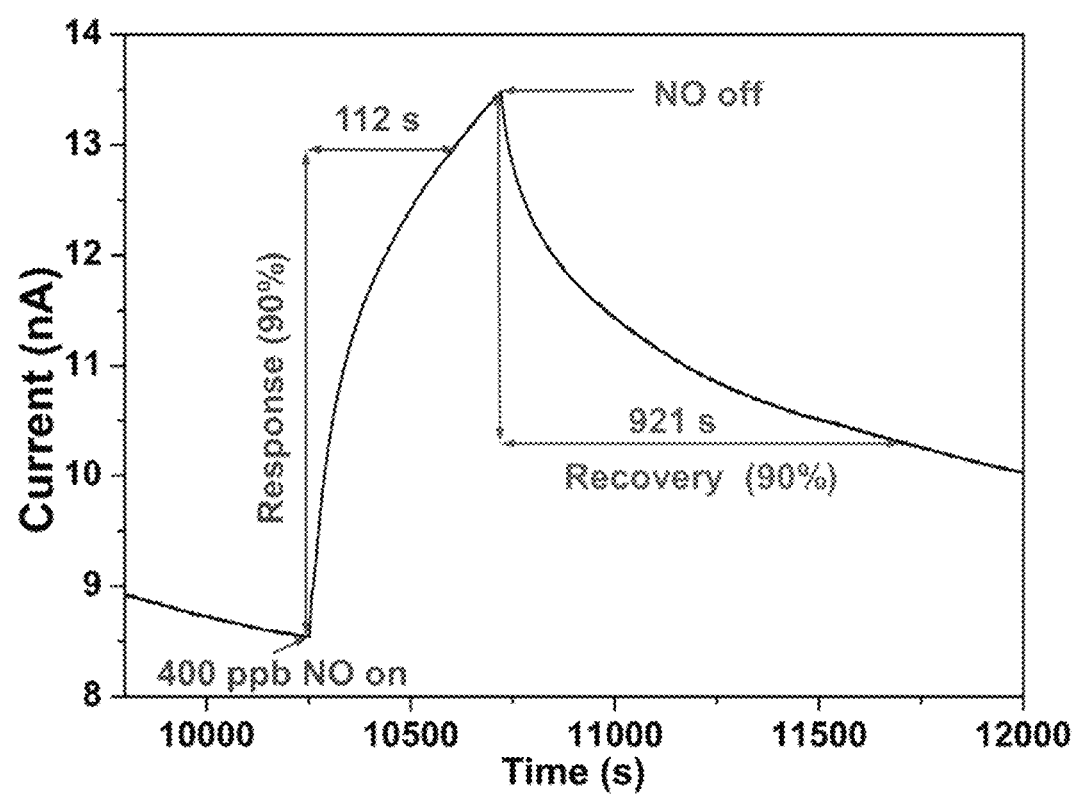
FIG. 12 shows the response time and recovery time of the sensor to 400 ppb of nitric oxide.

From FIG. 9 and FIG. 12, the stability of the device is very good. The response time of the device to ammonia test is as short as 82 s, the recovery time of the device is as short as 185 s, and the response time to nitric oxide is 112 s, The recovery time is 921 s. It can be seen that the device not only has good stability, but also has short response time and short response time.

EXAMPLE 4

The preparation of the sensor:

(a) cleaning the glass substrate, and bonding the interdigital electrode to the substrate by a double-sided tape, the interdigitated electrode is made of alumina (1 mm), and a silver-palladium alloy electrode (100 nm) is disposed thereon, and the interdigitated width is 200 μm, the interdigitated spacing is 60 μm;

(b) The squaraine polymer (4 mg) of Example 1 is dissolved in ethanol (2 g) to make it uniformly dispersed, and obtain an ethanol solution;

(c) The ethanol solution of the squaraine polymer of Example 1 is brushed on the interdigitated electrode, brushed 20 times, and after each brushing, the surface is dried and brushed again, left at room temperature, and evaporated to dryness. Thereafter, it was dried in a vacuum oven at 80° C. for 1 h to obtain an ammonia/nitric oxide two-component sensor based on squaraine polymer, wherein the coating thickness was 400 μm.

EXAMPLE 5

The preparation of the sensor:

(a) cleaning the glass substrate, and bonding the interdigital electrode to the substrate by a double-sided tape, the interdigitated electrode is made of alumina (2 mm), and a silver-palladium alloy electrode (200 nm) is disposed thereon, and the interdigitated width is 200 μm, the interdigitated spacing is 60 μm;

(b) The squaraine polymer (4 mg) of Example 1 is dissolved in ethanol (1 g) to be uniformly dispersed, and obtain the ethanol solution;

(c) The ethanol solution of the squaraine polymer of Example 1 is brushed on the interdigitated electrode, brushed 20 times, and after each brushing, the surface is dried and brushed again, left at room temperature, and evaporated to dryness. Thereafter, it was dried in a vacuum oven at 60° C. for 1 h to obtain an ammonia/nitric oxide two-component sensor based on squaraine polymer, wherein the coating thickness was 400 μm.

As can be seen from FIG. 11, for different concentrations of nitric oxide atmosphere, the ammonia gas/nitric oxide two-component sensor based on squaraine polymer has different current changes in order to make different concentrations. The ammonia response is clearly differentiated, and subsequent measurements are made using voltages of 20V. The optimal condition for the quantity thus determined is therefore also determined.

EXAMPLE 6

Figure 13:
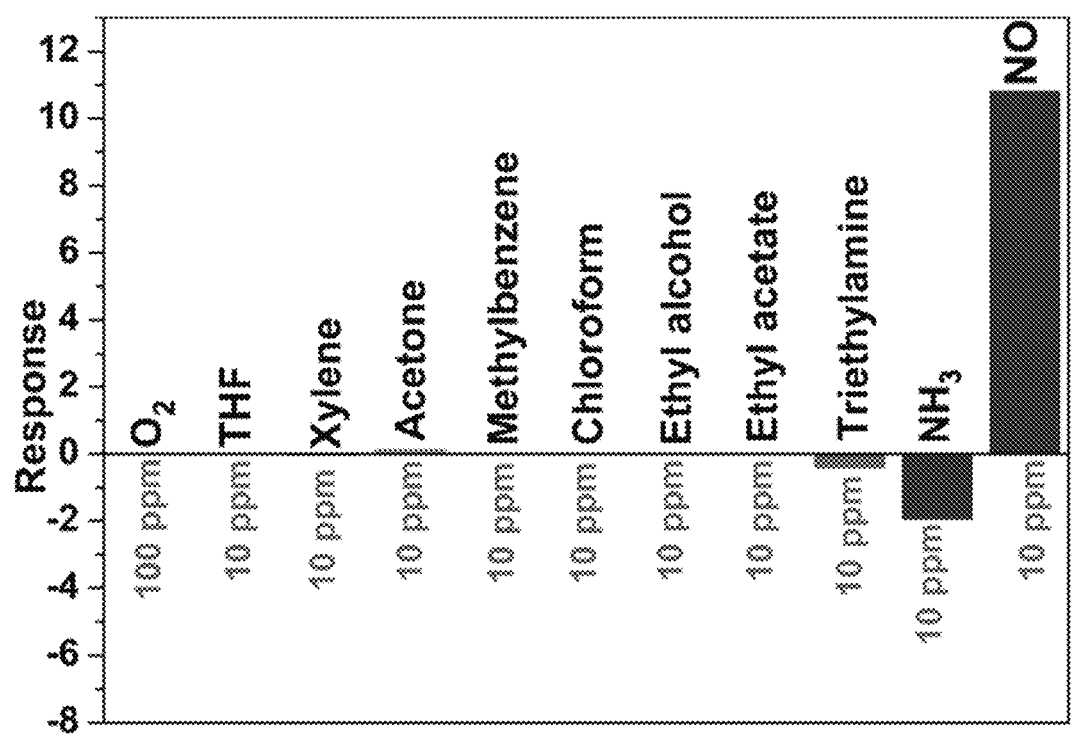
FIG. 13 shows the responsiveness of a squaraine polymer sensor to different gases.

Selective Responsiveness of an Ammonia/Nitric Oxide Two-Component Sensor Based on Squaraine Polymer to Organic/Inorganic Gases At a voltage of 20V, the device is first placed in a different gas atmosphere, and the response of the ammonia/nitric oxide two-component sensor based on squaraine polymer to different gases is measured. Oxygen, tetrahydrofuran, xylene, acetone, toluene, chloroform, ethanol, ethyl acetate, triethylamine, diethylamine and nitrogen dioxide are tested for responsiveness as in FIG. 13. Experiments have shown that this squaraine-polymer-based ammonium/nitrogen monoxide two-component sensor has a good selective response to both ammonia and nitric oxide.

In summary, the present invention achieves double detection of different concentrations of ammonia gas and nitrogen monoxide by fabricating a simple structure of a resistive thin film sensor, and has a fast response time and a fast recovery time, and the squaraine-based acid of the present invention is used. The ammonia/nitric oxide two-component sensor of the cyanine polymer solves the current problem of lacking the organic polymer ammonia/nitric oxide two-component sensor.

What is claimed is:

1. A squaraine-polymer-based ammonium/nitrogen monoxide two-component sensor, characterized in that said squaraine-polymer-based ammonium/nitrogen monoxide two-component sensor comprises an interdigital electrode and a coating material coated on said interdigital electrode; said coating material is a squaraine polymer; the chemical structure of said squaraine polymer is:

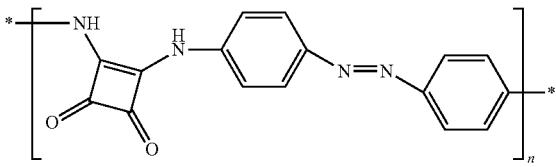

wherein n is 20 to 50.

2. The squaraine-polymer-based ammonium/nitrogen monoxide two-component sensor according to claim 1, wherein said squaraine-polymer-based ammonium/nitrogen monoxide two-component sensor also comprises a substrate; the thickness of said coating material is 100 to 400 μm, said interdigital electrode is based on an alumina layer having a thickness of 2 mm, on which a silver-palladium alloy electrode with a thickness of 100 to 200 nm is disposed, said interdigital electrode has a finger width of 100 μm and a finger pitch of 60 μm.

3. A preparation method of the squaraine-polymer-based ammonium/nitrogen monoxide two-component sensor according to claim 1, characterized in comprising the following steps: brushing said squaraine polymer solution on the interdigital electrode, placing at room temperature, removing the solvent and drying for 0.5 to 2 hours at 50 to 80° C. to obtain the squaraine-polymer-based ammonium/nitrogen monoxide two-component sensor.

4. The preparation method of the squaraine-polymer-based ammonium/nitrogen monoxide two-component sensor according to claim 3, wherein cleaning a substrate and fixing the interdigital electrode on the substrate before brushing said squaraine polymer solution on the interdigital electrode; in said squraine polymer solution, the mass ratio of the squaraine polymer to the solvent is 4:(1 to 2).

5. The preparation method according to claim 3, wherein the solvent is selected from any one of ethanol, dichloromethane, and ethyl acetate; and the brushing is performed by using a brush pen.

6. A squaraine polymer, the chemical structure of said squaraine polymer is:

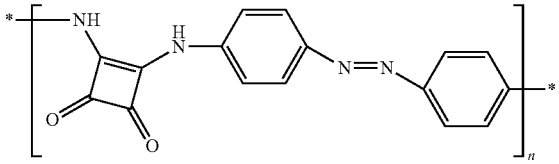

wherein n is 20 to 50.

7. A preparation method of the squaraine polymer according to claim 6, characterized in comprising the following steps, heating and reacting in a solvent using 4,4'-diaminoazobenzene and squaric acid as raw materials to obtain the squaraine polymer.

8. A preparation method of a squaraine polymer solution, characterized in comprising the following steps, heating and reacting in a solvent using 4,4'-diaminoazobenzene and squaric acid as raw materials to obtain a squaraine polymer; dissolving the squaraine polymer in a solvent according to a mass ratio of the squaraine polymer: the solvent equal to 4:(1 to 2), and dispersing it uniformly to obtain a squaraine polymer solution, the chemical structure of said squaraine polymer is:

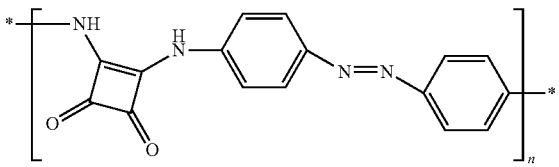

wherein n is 20 to 50.

9. A squaraine polymer solution prepared using the preparation method of a squaraine polymer solution according to claim 8.

* * * * *